Oct. 6, 1970  B. B. PUSEY ET AL  3,532,783
METHOD OF MOLDING BONDED MESSENGER CABLE
Filed Feb. 28, 1968

INVENTORS
BRANDON B. PUSEY
WARNER T. SMITH
BY
ATTORNEY

United States Patent Office 3,532,783
Patented Oct. 6, 1970

3,532,783
METHOD OF MOLDING BONDED MESSENGER CABLE
Brandon B. Pusey and Warner T. Smith, Hickory, N.C., assignors to Superior Continental Corporation, Hickory, N.C., a corporation of Delaware
Continuation-in-part of application Ser. No. 521,166, Jan. 17, 1966. This application Feb. 28, 1968, Ser. No. 709,139
Int. Cl. B29c 25/00; B29f 3/10; H01b 7/00
U.S. Cl. 264—135                                8 Claims

ABSTRACT OF THE DISCLOSURE

Disclosed herein is a method of bonding an outer protective extruded jacket onto an electrical energy carrying cable and a messenger supporting cable running essentially parallel to the cable carrying the electrical energy. So as to achieve a sufficient bond between the messenger (support) cable to an outer extruded jacket, the molding process disclosed herein sets forth the steps of first heating the messenger cable, then depositing on this cable a two component thermoplastic resin one component of which is adapted to adhere to the metal messenger cable and the other component being of the same class and chemical family of resin used for the outer jacket. Extruded simultaneously over this coated messenger cable and the cable intended for carrying the electrical energy is a thermoplastic resin of the same class and chemical family as that of one of the components of the resin adhesive used in coating the messenger wire. Since the melting point of the resin adhesive coating is higher than that of the jacket resin, upon cooling the composite bonded cable after the extrusion step there is first solidified the resin in the area immediately adjacent the messenger cable and then the resin used for the jacket.

---

The instant application is a continuation in part of application Ser. No. 521,166 filed Jan. 17, 1966 (now abandoned) which in turn was a division of application Ser. No. 314,011 filed Oct. 4, 1963, now U.S. Pat. No. 3,276,201.

This invention relates to electrical conducting cables of the type incorporating a supporting messenger wire in a common insulating envelope or jacket, and consists more particularly in new and useful improvements in a method of producing this type of messenger cable wherein the supporting messenger is formed of a solid wire to which the jacket is adhesively bonded.

As pointed out in said copending application, conventional messenger cables of this general type have employed stranded wire for the supporting messenger, and in the manufacture of such cables, the jacket material which is applied in the molten state, tends to follow the contours of the individual wires in the strand of supporting cable, with the result that a gripping aciton is effected which prevents movement of the cable core and the jacket with respect to the messenger.

For economical reasons, these stranded wire supporting messengers have been replaced with a solid supporting wire, but it has been found that relative motion between the jacket and the messenger frequently occurs, since the jacket material cannot grip the solid supporting wire with a sufficient gripping action to avoid relative movement. Experience has shown that in the use of this type of cable in the field, if the cable is installed on a grade, the jacket and cable core tend to slide along the supporting wire toward the lowest point in the grade. Thus, with gravity imposing a continuous force on the cable core, vibrations in the earth and wind movements cause the cable to creep downhill with the result that the conductors in the cable core elongate and break near the top of the grade.

Also, in certain windy areas of the country, it is desirable to twist a spiral into the cable and messenger to equalize wind forces throughout a span, and when a single solid wire messenger is employed with the cable jacket loose thereon, the cable merely rotates around the messenger and it is impossible to twist a spiral into the span.

Attempts have been made to remedy this condition by employing a mechanical gripping action between the jacket and the solid supporting wire, such for example, as by providing the solid wire with peripheral deformations which engage and grip the jacket. However, the provision of deformations in the wire presents a difficult and expensive problem from the standpoint of manufacture, and furthermore, after such a wire is galvanized, this procedure damages the zinc coating which subsequently shortens the life of the product.

It is therefore the primary object of the present invention to provide a method of producing a bonded messenger cable which provides performance characteristics identical to the messenger cable employing stranded supporting wire, and at the same time, permits the use of the more economical solid wire with none of the disadvantages of the surface deformed solid wire.

Another object of the invention resides in the method of bonding a solid supporting wire within the common jacket surrounding the cable core.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views.

Figure 3:
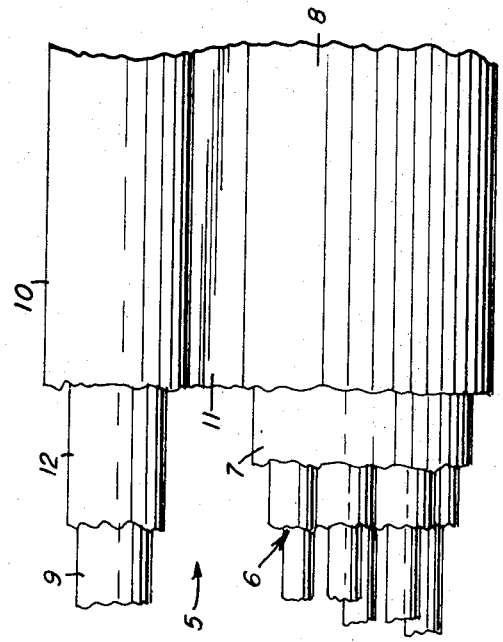
FIG. 3 is a fragmentary view in side elevation, partially broken away, to illustrate the various elements of the invention.
Figure 2:
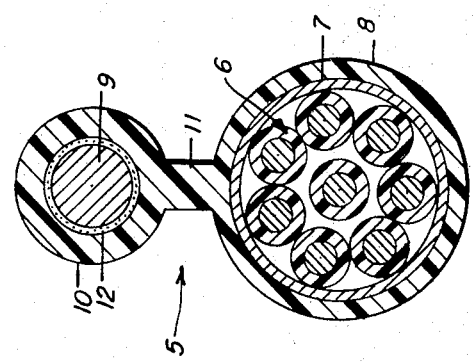
FIG. 2 is a transverse sectional view through the fabricated messenger cable of the invention.

In the drawings, referring first to FIGS. 2 and 3, the bonded messenger cable of the invention is indicated generally by the numeral 5, and consists of a cable core 6 comprising a conventional series of insulated conductor strands. The core 6 is enveloped by usual core covering tape 7 and is covered by a tubular polyethylene cable jacket 8. Above the core 6 and spaced laterally therefrom, is a parallel, single supporting or messenger wire 9 which is preferably composed of zinc covered steel and separately enclosed in a polyethylene jacket 10, formed integrally with the core jacket 8 and spaced therefrom by an integral, intervening web 11. As will later appear, the composite jacket 8, 10 and the web 11 are applied to the respective core and messenger wire by a conventional extrusion process. However, incorporated in this process of fabrication, is a novel method of applying an adhesive layer 12 which is bonded to the solid messenger wire 9 and the surrounding jacket portion 10. In the drawings, this adhesive layer 12 is somewhat exaggerated in thickness for purposes of illustration.

Figure 1:
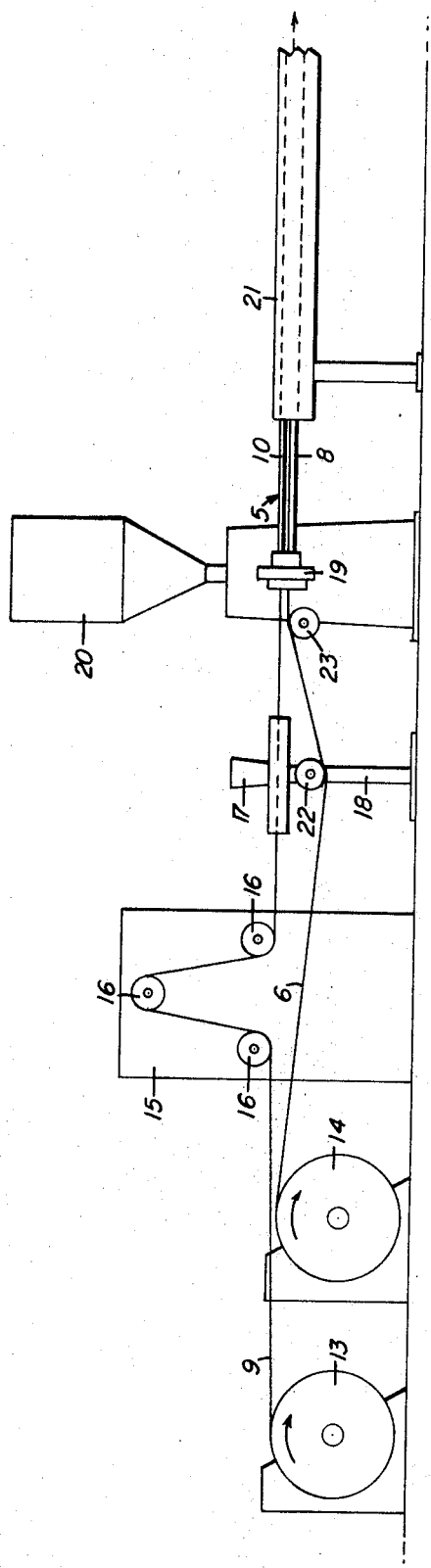
FIG. 1 is a diagrammatic illustration of one method which may be employed in producing the bonded messenger cable of the present invention.

A method and apparatus for producing a bonded messenger cable in accordance with the invention is diagrammatically illustrated in FIG. 1, where 13 represents a payoff reel carrying a supply of solid support wire 9 which is preferably a zinc coated steel wire. 14 is a similar payoff reel carrying a supply of prefabricated conventional cable core 6. Following in the production line and diagrammatically illustrated at 15 is a preheater, preferably of the electric resistance type and including a series of rollers 16 over which the messenger wire 9 is adapted to pass in its course through the preheater. From the preheater 15, the messenger wire passes through the trough of an adesive applicator 17, mounted on a stand 18, and aligned with the final roller 16 in the preheater. A conventional extruder 19, having a supply hopper 20 for molten polyethylene or the like, is disposed adjacent the adhesive applicator 17 and this is followed by a cold water cooling trough 21, spaced a predetermined distance from the exit end of the extruder 19, as will later appear.

The cable core 6 fed from payoff reel 14 is caused to bypass the preheater 15 and passes over a downwardly offset roller 22, mounted on the stand 18, and posterior to the adhesive applicator 17, the core is brought upwardly over a second roller 23 to align it with the inlet end of the crosshead of extruder 19, where a composite polyethylene jacket 8, 10 and its intervening web 11, is formed around the cable core 6 and supporting wire 9, which is then conducted to the spaced cooling trough 21. As the jacketed cable leaves the extruder 19, it embodies a cross-sectional shape, as represented by FIG. 2.

More specifically, in practising the method of the invention, the zinc coated steel messenger wire 9 is first preheated in preheater 15 to a temperature of between 280° and 330° F., and while at this elevated temperature, the wire is immediately passed through the adhesive applicator 17. In this applicator, the periphery of the solid wire is caused to contact flakes of a maleic modified high density polyethylene containing active polar groups, contained in the trough of the applicator 17. A material suitable for this purpose is manufactured by Union Carbide Plastics Company and designated by them as "DQWA 0301," although other materials having these characteristics may be used. This particular material is a high density polyethylene modified with maleic acid. Such a modification results in a two-component composite molecule, one component being a polyethylene chain-like configuration in combination with a maleic complex chemically bonded thereto. It is the maleic complex, not the polyethylene, that has the affinity and bonding characteristic to metal or another substrate of unlike material, whereas with this in view it is then clear that the polyethylene chain-like portion of the composite molecule is so adapted that it can become an integral part of any subsequently added polyethylene. Thus, in the context of the instant invention, the maleic modified polyethylene is applied to the metallic substrate such as the messenger cable 9. The polyethylene portion of the material so applied will not by itself easily adhere to the metal. In fact, it is well known that it is most difficult to bond polyethylene to any metal preform that has a smooth surface such as the messenger cable 9. On the other hand, the maleic complex is such that it has a strong affinity for the metal element 9. Hence, it can be readily understood that the maleic complex is the bonding material of the polyethylene-maleic composite and the polyethylene portion of the molecule is that which becomes a part of any subsequently applied additional polyethylene. One important feature of the instant invention in the area of the polyethylene-maleic combination is that the polyethylene used here is of the so called high density type and generally has a melting point of around 130° C. This is in comparison to the polyethylene used for the outer jacket 10 itself, which is a so called low density polyethylene and generally has a melting point around 105° C.

It has been observed that when polyethylene, either high or low density type, is extruded onto a substrate, for example extruding polyethylene around a metallic wire, the hot thermoplastic polyethylene upon cooling to a solidified state tends to shrink. Naturally, because of heat transfer considerations, it is the polyethylene exposed most nearly to the ambient temperatures (heat sink) that freezes first. As the freezing takes place from the outside towards the center where the metallic wire is located there is shrinkage taking place. It is this shrinkage that tends to pull that still thermoplastic and not yet frozen polyethylene material radially away from the wire with which it was formerly in contact. Thus any bond that may have been created or even contemplated is broken. It is the purpose of the instant invention to solve this problem by the judicious choosing of melting points for materials that form the innermost adhesive layer 12 and the outermost covering jacket 10 in combination with predetermined adhesive properties of the first applied design material.

Since the melting point of the polyethylene modified with maleic acid is greater than that melting point used for the jacket material 10, it then becomes quite clear as to how the materials in the instant invention are quite important and critical to the success or failure of the process contemplated. Viewing FIG. 2 for example, that is what the cross-section of the cable looks like upon emerging from the extruder head 19. The entire cable jacket is around 400° F. as it so emerges. Thus, when it is known that the melting point of the adhesive 12 is greater than the jacket 10, it is easy to visualize that as the temperature drops by means of the ambient conditions or the cooling fluid in trough 21, it will be the plastic adhesive material 12 that will first solidify. Hence, the bond between the adhesive and metal is completed first and only a force of a magnitude sufficient to break apart a molecule could separate the adhesive from the metal, i.e. break the maleic portion away from the polyethylene part. Immediately after the molded cable emerges from the polyethylene part. Immediately after the molded cable emerges from the extruder head there is a flash cooling of the outermost suface of the jacket 10. The result of this flash cooling takes the form of a thin frozen layer with the innermost portions of the jacket being still in the thermoplastic state. As further cooling takes place, the freezing of the polyethylene modified adhesive material 12 takes place. Subsequently, there is the freezing of the balance of the low density thermoplastic material (polyethylene) that lies between the already frozen adhesive layer and the outer first frozen skin of low density polyethylene. As stated previously, the high density polyethylene portion of the adhesive layer becomes an integral part of the low density outer polyethylene jacket material 10. Thus, any shrinkage of the last to freeze low density polyethylene material does not tend to pull away the polyethylene from the messenger member 9. Quite the contrary, since the bond between the messenger member 9 and the adhesive layer has already been established and the still cooling and still pyroplastic low density polyethylene of the outer jacket is pliable and able to conform to applied forces, any such shrinkage forces will tend to pull the outer jacket inwardly into conformity to the already cooled inner jacket formed of maleic modified high density polyethylene.

In summary, any cooling process taking place after extrusion will inherently form a flash cooled skin of low density polyethylene on the outermost surface of the jacket 10. Subsequently, the modified high density polyethylene adhesive material is solidified into a self-supporting tubular mass, the maleic portion of this modified polyethylene bonding itself tightly to the wire means 9. Then, upon still further cooling, the balance of the low density polyethylene material is frozen, any shrinkage forces tending to pull inwardly the last to freeze low density polyethylene into compact adhesive bonding relationship with the polyethylene portion of the high density modified adhesive layer.

During its passage through the adhesive applicator 17, the hot messenger wire 9 melts the flakes above referred to, and picks up a thin layer 12 (FIG. 2) of modified polyethylene which is deposited on the wire in liquid form, and the adhesive coated wire, along with the simultaneously advancing cable core 6, is immediately passed into the crosshead of the extruder 19 where the composite polyethylene jacket 8, 10, in a molten state and at a temperature of approximately 400° F., is formed around the cable core and supporting wire.

As the jacketed cable exits from the extruder, it is cooled by air for a short distance, as seen in FIG. 1, and then immersed in the cold water trough 21 which, as will later appear, may comprise two longitudinally aligned troughs for providing sequential water cooling stages.

It should be noted that the heat balance during the cooling cycle is critical. It is desirable before the polyethylene jacket 8, 10 is solidified completely, to cool the space adjacent the zinc coated steel wire to a temperature below 250° F., at which temperature the maleic modified high density polyethylene will solidify and form a bond between the zinc coated steel wire and the polyethylene jacket. After the bond is established, further cooling of the jacket can take place with no disruption of the bonding. If too long a period is allowed before the polyethylene jacket is cooled to below 250° F., however, damage to the insulated conductors 6 within the jacket can occur, along with deformation of the web 11 connecting the main body of the cable to the supporting wire. It is therefore important that a correct balance be established to permit the bonding of the polyethylene jacket 10 to supporting wire 9, without damage to the conductor insulation or the web of the jacket.

The factors affecting the rate of heat removal during the cooling cycle, are the size of the zinc covered steel wire 9 and the wall thickness of the polyethylene jacket 10. The smaller the wire 9 and the thinner the jacket wall 10, the easier it is to achieve an acceptable rate of heat removal. On the other hand, large wires with heavy polyethylene jacket walls, require very close control of the rate of heat removal.

The following approximate examples will illustrate two typical heat removal procedures in the fabrication of bonded messenger cables of different specifications:

1. 6 pair 19 gauge with .109" supporting wire
   Wall thickness of jacket—.040"
   Supporting wire temperature—300° F.
   Polyethylene stock temperature—400° F.
   Line speed—155 feet per minute
   Air cooling space—14"
   1st cooling water trough—65° F.—14' long
   2nd cooling water trough—80° F.—30' long
2. 18 pair 19 gauge with .134" supporting wire
   Wall thickness of jacket—.060"
   Supporting wire temperature—300° F.
   Polyethylene stock temperature—400° F.
   Line speed—88 feet per minute
   Air cooling space—8"
   Two jets of 65° F. water sprayed on web section of cable 4" from extruder exit
   1st cooling water trough—65° F.—14' long
   2nd cooling water trough—80° F.—30' long The present invention contemplates the use of materials other than polyethylene, provided an adhesive suitable for use with the particular material is employed. One such material which has proven satisfactory is polyvinyl chloride, manufactured by Union Carbide Plastics Company and designated by them as "VMCH." Also, it is possible to bond these materials to wires other than zinc covered steel wire, such as example, as copper and copper covered steel wire, as well as aluminum and aluminum covered steel wire.

It will be apparent that the method and article of this invention provide a bonded messenger cable having all of the advantages of the conventional messenger cables employing stranded supporting wire, while at the same time, enabling the use of the more economical solid supporting wire.

From the foregoing, it is believed that the invention may be readily understood by those skilled in the art without further description, it being borne in mind that numerous changes may be made in the details disclosed without departing from the spirit of the invention as set forth in the following claims.

We claim:
1. A method of forming a bonded messenger cable to secure a cable core-supporting wire and an insulating jacket against relative longitudinal movement in the type of cable in which the insulating jacket covers both the supporting wire and a laterally spaced, supported, electrically conductive cable core, said method comprising the steps of:
   (a) simultaneously advancing said cable core and said supporting wire in laterally spaced apart relation with respect to each other;
   (b) preheating said supporting wire;
   (c) depositing on the periphery of said wire while the latter is still in heated condition, a liquid coating of thermoplastic resin composed of first and second components, the first of said components having an adhesive affinity for said wire and the second component belonging to the same chemical family as a later applied resin;
   (d) simultaneously extruding on the peripheries of said spaced core and coated supporting wire, a jacket of molten insulating resin having a solidification temperature sufficiently below that of the resin used in step (c) to enable the coating used in step (c) to solidify before the insulating jacket upon cooling; and,
   (e) cooling the composite produced in step (d) to first solidify the coating used in step (c) for forming a bond between it and said supporting wire and to thereafter solidify the jacket material used in step (d) so that it becomes integral with the second component of the coating used in step (c), whereby the bond between the coating used in step (c) and said supporting wire is formed before solidification of at least the inner portion of the jacket material used in step (d) to prevent any shrinkage of the jacket material used in step (d) from pulling the jacket away from the supporting wire.

2. The method as claimed in claim 1, wherein said thermoplastic resin is a polyethylene modified with a material containing active polar groups.

3. The method as claimed in claim 1, wherein said heated wire is passed through a quantity of solid maleic-modified, high density polyethylene, utilizing the heat of said wire to melt said polyethylene and form a liquid coating thereof on the periphery of said wire.

4. The method as claimed in claim 1, wherein said supporting wire is steel and is preheated to between 280° F. and 330° F.

5. The method as claimed in claim 4, wherein the material of said jacket is polyethylene and is heated to a temperature of approximately 400° F.

6. The method as claimed in claim 5, wherein said extruded jacket is cooled by air for a short period prior to a further cooling by a fluid means.

7. The method as claimed in claim 1, wherein said supporting wire is formed of zinc coated steel.

8. A method of forming a cable to secure a cable core-supporting wire and an insulating jacket against relative longitudinal movement in the type of cable in which the insulating jacket covers both the supporting wire and a laterally spaced, supported, electrically conductive cable core, said method comprising the steps of:
   (a) arranging said cable core and said supporting wire in laterally spaced apart relationship to each other;
   (b) depositing on the periphery of said wire a liquid coating of thermoplastic resin having first and second constituents, the first of said constituents having an adhesive affinity for said wire and the second constituent belonging to the same chemical family as a later applied insulating resin;

(c) simultaneously extruding on the peripheries of said core and spaced coated supporting wire a jacket of said insulating resin in molten form, said insulating resin having a solidification temperature sufficiently below that of the resin applied to said wire in step (b) to enable the coating used in (b) to solidify before the insulating jacket upon cooling; and, (d) cooling the composite produced in step (c) to first solidify the coating used in step (b) for forming a bond between it and said supporting wire and to thereafter solidify the jacket material used in step (c) so that it becomes integral with said second constituent of the coating used in step (b), whereby the bond between the coating used in step (b) and said supporting wire is formed before solidification of at least the inner portion of the jacket material used in step (c) to prevent any shrinkage of the jacket material used in step (c) from pulling the jacket away from the supporting wire.

References Cited

UNITED STATES PATENTS

| | | | |
|---|---|---|---|
| 2,979,431 | 4/1961 | Perrault | 264—174 |
| 3,074,107 | 1/1963 | Mase et al. | 264—174 |
| 3,100,136 | 8/1963 | D'Ascoli et al. | 264—174 |
| 3,113,934 | 12/1963 | Grossman | 264—174 |
| 2,479,919 | 8/1949 | Flood | 264—174 |
| 3,132,120 | 5/1964 | Graham et al. | 260—78.5 |
| 3,206,541 | 9/1965 | Jachimowicz | 174—107 |
| 2,226,938 | 12/1940 | McCarthy | 264—174 |
| 3,379,821 | 4/1968 | Garner | 174—107 |

ROBERT F. WHITE, Primary Examiner

J. R. THURLOW, Assistant Examiner

U.S. Cl. X.R.

174—70, 102, 120; 260—45.5, 78.5; 264—174, 237